April 18, 1961  E. A. ANDREW  2,979,764
PELLETING APPARATUS
Filed June 26, 1958  2 Sheets-Sheet 1

INVENTOR.
EUGENE A. ANDREW
ATTORNEYS

April 18, 1961 E. A. ANDREW 2,979,764
PELLETING APPARATUS
Filed June 26, 1958 2 Sheets-Sheet 2

INVENTOR.
EUGENE A. ANDREW
BY
ATTORNEYS

United States Patent Office 2,979,764
Patented Apr. 18, 1961

2,979,764

PELLETING APPARATUS

Eugene A. Andrew, Berkeley, Mo., assignor to Olin Mathieson Chemical Corporation, East Alton, Ill., a corporation of Virginia Filed June 26, 1958, Ser. No. 744,763

6 Claims. (Cl. 18—2.7)

This invention relates to the manufacture of spherical particles and particularly to apparatus for their manufacture.

Spherical pellets of flowable, solidifiable material are normally made by passing the liquid material through orifices and preferably through a multiplicity of orifices in a perforated plate. The liquid material forms into drops in passing thorugh the perforations or orifices and the drops assume a spherical or egg-shape as they pass through air or other fluid medium. Such processes are generally used for the manufacture of spherical particles from organic plastic materials such as nitrocellulose and polyvinyl chloride liquified by heat or solvation, from molten salts including ammonium nitrate, and from relatively low melting metals such as lead and the like.

In these processes, the size of the spherical or near-spherical pellets and the rate of production is dependent on the viscosity and surface tension of the liquid being treated and also upon the orifice size used. Thus, such methods are not normally controllable by external means but are primarily limited by the intrinsic characteristics of the particular material being pelleted. External means for severing liquid material from the orifice or perforation have been previously considered but are subject to a number of inherent disadvantages. When such external severing means are employed, the liquid has a tendency to build up on the external face of the orifice and to be smeared by any external means employed. In addition, when such external means are used, it militates against providing the drop forming orifices with nozzles or other apparatus to assist in drop formation.

It is, therefore, an object of this invention to provide pelleting or spheroidizing apparatus overcoming the disadvantages of the prior art. It is also an object of this invention to provide novel and improved apparatus for the manufacture of uniformly sized spherical particles. A more specific object of this invention is to provide such apparatus in which more uniformly sized and shaped particles can be formed at an increased rate.

Generally stated, these and other objects are achieved in accordance with this invention by flowing or passing liquified material through orifices in a perforated plate and internally interrupting the flow of the material through the orifices to form drops of predetermined size. The liquid flow through the orifices is interrupted by sequentially opening and closing each of the orifices by a member riding on their internal surfaces. The flow of the liquid through the orifices is most readily interrupted by a flat member having at least one open portion moving in contact with the internal face of the perforated plate. This flat member most convenient'y takes the form of a vaned rotor or a reciprocating plate. As the flat member is passed over the perforated plate, each of the orifices or perforations is alternately opened and closed so as to permit a predetermined amount of liquid to pass through the orifice and collect in the form of a droplet on the external face of the plate. As the droplets are formed, they are severed from the plate by gravity in conjunction with any suitable vibratory means.

Two embodiments of the invention are illustrated in the accompanying drawing in which.

Figure 1:
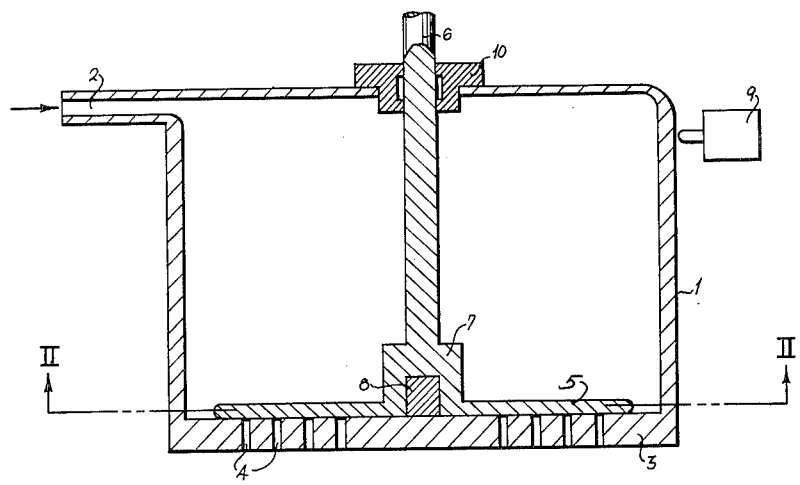
Figure 1 is a longitudinal sectional view of such an apparatus.
Figure 2:
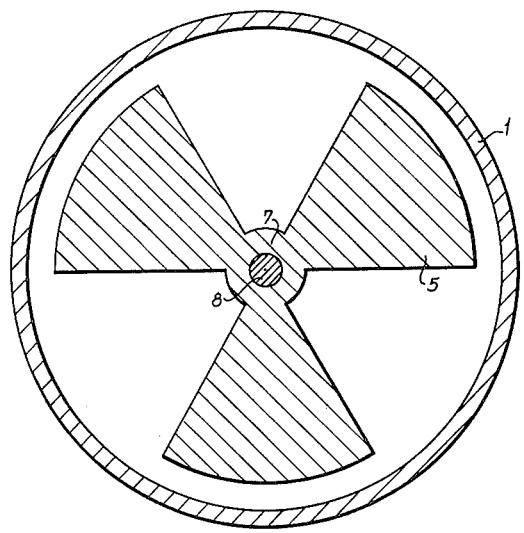
Figure 2 is a sectional view taken along the line II—II of Figure 1.

As shown in Figure 1, the apparatus comprise a cylindrical enclosing vessel 1 having an intake port 2 for the liquid being treated and a base plate 3 provided with perforations 4. A plate having vanes 5 is in sliding contact with the internal surface of base plate 3. The vanes 5 are connected to a rotating shaft 6 through hub 7 which is journaled on pivot pin 8. In leaving chamber 1, the rotating shaft passes through a bushing shown generally at 10. The chamber is provided with any suitable vibrating means shown generally at 9.

In operation, lacquer or the like is introduced through the intake port 2 by any convenient means. Chamber 1 is thus at least partially filled with the lacquer which flows through perforations 4 in the base plate 3. Rotating vanes 5 alternately open and close the perforations thus controlling the amount of lacquer in each drop which is formed as the lacquer passes through the perforations. Any tendency for the droplets to accumulate on the external surface of the base plate is overcome by the influence of vibrator 9.

Figure 3:
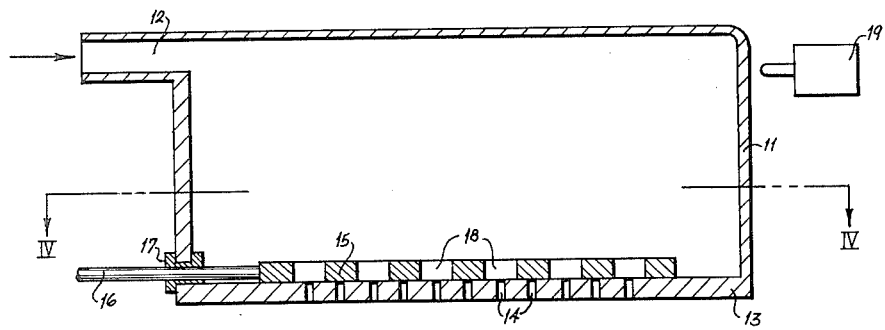
Figure 3 is a longitudinal sectional view of another embodiment of this invention.

In the form shown in Figure 3 of the drawing, the apparatus consists of a chamber 11 provided with an intake port 12 and a base plate 13 provided with perforations 14. In this embodiment, the perforations are alternately opened and closed by the reciprocating motion of plate 15. This reciprocating motion is imparted to plate 15 by shaft 16 which enters chamber 11 through a bushing shown generally at 17. While only one shaft is shown, it will be readily appreciated that additional shafts can be positioned at one or both ends of plate 15. Likewise, reciprocating plate 15 can be maintained in sliding relationship with base plate 13 by any convenient or conventional means not shown and not forming a part of the present invention. Reciprocating plate 15 is provided with transverse slots 18 and the perforations in plate 13 are positioned to cooperate with slots 18. As shown in the drawing, these perforations are arranged in substantially parallel rows and there are two rows of perforations for each transverse slot in the reciprocating plate. In this manner, alternate rows of perforations are opened and closed at each end of the reciprocating stroke of p'ate 15. In this embodiment, the reciprocating action is through a path substantially equal to the distance between two adjoining rows of perforations. Here again, chamber 11 is provided with a vibrating means shown generally at 19.

Figure 4:
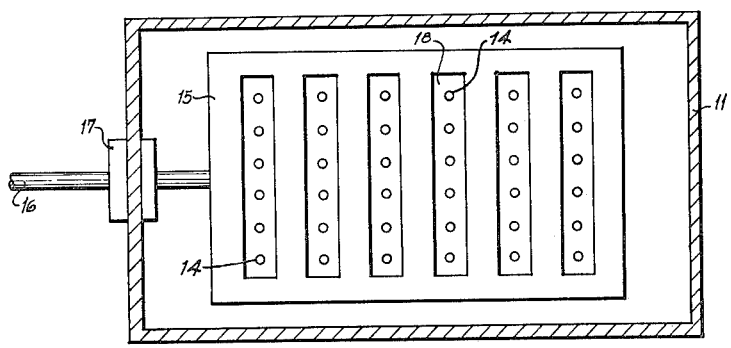
Figure 4 is a transverse view taken along the line IV—IV of Figure 3.

Although in the embodiment of Figures 3 and 4, the reciprocating plate has a plurality of transverse slots and the base plate of the chamber is provided with twice as many rows of perforations, any other configuration of open areas and perforations will work equally well provided that each perforation is alternately opened and closed so as to intermittently interrupt the flow of lacquer or the like therethrough. In like manner, the rotor shown in Figure 1 need not be vaned but can have one or more open areas which will permit the liquid to flow through the perforations when they and the open areas are in alignment.

The several orifices have a diameter chosen in accordance with the size of the droplets it is desired to form. Preferably, all of the orifices in a given chamber are of the same size. The provision of an internal liquid flow interrupting means has the advantage of utilizing the liquid being treated as a lubricant between the moving parts. In addition, such internal means permits the use of a base plate having a non-planar external face. When the apparatus is used for the preparation of spherical particles of a material that will solidify in air or other gaseous medium, it is maintained substantially in the position shown in the drawing. However, when the material being treated is solidified by passing the droplets through a bath having a greater specific gravity than the droplets, the apparatus can be inverted.

From the foregoing description, those skilled in the art should readily understand that the invention accomplishes its objects and provides an apparatus for the manufacture of uniformly sized and shaped particles at a high rate of production. While in the above embodiments a cylindrical chamber has been described in association with a rotating blade, and a rectangular chamber in association with a reciprocating plate, it will be readily appreciated that the chamber can assume any convenient configuration. It is only necessary that the internal liquid interrupter and the perforations in the base plate be coordinated to insure alternate opening and closing of the perforations.

While two complete embodiments of the invention have been disclosed in detail, it is to be distinctly understood that the invention is susceptible to numerous modifications, variations and adaptations which those skilled in the art will be expected to make as the apparatus may be applied to particular problems. It is, therefore, to be distinctly understood that the invention is not limited by the foregoing disclosure except as indicated in the appended claims.

What is claimed is:

1. An apparatus for forming liquid spherical particles of uniform predetermined particle size comprising, a chamber having a liquid inlet port and a flat wall having a plurality of perforations therethrough, means for flowing liquid into the chamber through said inlet port and out through the perforations, a flat rotor within the chamber parallel to and riding on the interior of the flat perforated wall, at least one open area in the rotor, a drive shaft for the rotor, and means for vibrating the chamber.

2. The apparatus of claim 1 in which the rotor is vaned.

3. An apparatus for forming liquid spherical particles of uniform predetermined particle size comprising a chamber having a liquid inlet port and a flat wall having a plurality of perforations therethrough, means for flowing liquid into the chamber through said inlet port and out through the perforations, a flat reciprocating plate within the chamber parallel to and riding on the interior of the flat perforated wall, the plate being provided with at least one open area, the location of the open area in the plate and of the perforations in the flat wall being positioned in such a manner that each perforation is alternately opened and closed by the reciprocating plate, means for imparting a reciprocal action to the plate, and means for vibrating the chamber.

4. An apparatus for forming liquid spherical particles of uniform predetermined particle size comprising a chamber having a liquid inlet port and a flat wall having spaced substantially parallel rows of perforations therethrough, means for flowing liquid into the chamber through said inlet port and out through the perforations, a flat reciprocating plate within the chamber parallel to and riding on the interior of the flat perforated wall, the plate being provided with a series of slots substantially perpendicular to the reciprocating axis of the plate and in general alignment with the rows of perforations, the location of the slots and the perforations being positioned in such a manner that each perforation is alternately opened and closed by the reciprocating plate, means for imparting a reciprocal motion to the plate, and means for vibrating the chamber.

5. The apparatus of claim 4 in which there is one slot for each two rows of perforations, and wherein alternate rows of perforations are closed at one end of the reciprocating stroke and open at the opposite end of the reciprocating stroke.

6. An apparatus for forming liquid spherical particles of uniform predetermined particle size from a flowable liquid which comprises a chamber having an inlet port and a flat wall with a plurality of orifices passing therethrough, means for flowing a liquid into the chamber through the inlet port and out through the orifices, the orifices being sufficiently large to permit gravity flow, a planar member within the chamber parallel to and in sliding contact with the flat wall, the planar member having at least one open area, means for moving the planar member in sliding relationship to the flat wall so as to periodically interrupt the flow of fluid through each of the perforations, and means for vibrating the chamber.

References Cited in the file of this patent

UNITED STATES PATENTS

| 1,637,377 | Heicke | Aug. 2, 1927 |
| 2,063,663 | Downard | Dec. 8, 1936 |
| 2,180,968 | Schorn et al. | Nov. 21, 1939 |
| 2,436,211 | Hart | Feb. 17, 1948 |
| 2,510,574 | Greenhalgh | June 6, 1950 |
| 2,666,948 | Guenther et al. | Jan. 26, 1954 |
| 2,714,224 | Schaub | Aug. 2, 1955 |
| 2,770,835 | Williams | Nov. 20, 1956 |

FOREIGN PATENTS

| 619,841 | France | Jan. 6, 1927 |
| 443,413 | Germany | Apr. 28, 1927 |
| 229,711 | Great Britain | Feb. 26, 1925 |